US006546128B1

(12) United States Patent
Uchiyama

(10) Patent No.: US 6,546,128 B1
(45) Date of Patent: Apr. 8, 2003

(54) COLOR IMAGE FORMING METHOD, COLOR IMAGE FORMING APPARATUS, COVERING SHEET AND COLOR IMAGE

(75) Inventor: Koichi Uchiyama, Ibaraki-Ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 08/644,006

(22) Filed: May 9, 1996

(30) Foreign Application Priority Data

May 16, 1995 (JP) ............ 7-117101
May 16, 1995 (JP) ............ 7-117102
May 16, 1995 (JP) ............ 7-117103

(51) Int. Cl.[7] ............ G06K 9/00
(52) U.S. Cl. ............ 382/162; 283/117; 428/195
(58) Field of Search ............ 382/162; 428/195, 428/207; 430/253, 256; 283/117

(56) References Cited

U.S. PATENT DOCUMENTS 2,270,746 A 1/1942 Wyckoff
3,329,590 A 7/1967 Renfrew
3,429,702 A 2/1969 Lorber
4,458,175 A * 7/1984 Weekley ............ 313/472
4,731,313 A * 3/1988 Hameda ............ 430/42
5,792,588 A * 8/1998 Wilczak ............ 430/253
5,932,318 A * 8/1999 Uchiyama ............ 428/195

FOREIGN PATENT DOCUMENTS

| | | |
|---|---|---|
| DE | 652579 | 11/1937 |
| DE | 43 39 216 | 4/1994 |
| FR | 389297 | 9/1908 |
| FR | 665029 | 9/1929 |
| JP | 60-202446 | 10/1985 |

OTHER PUBLICATIONS

IBM Technical Disclosure Bulletin, vol. 25, No. 5, Oct. 1982, New York p. 2598 XP002012646, R. L. Garwin, Additive Color Printing.

* cited by examiner

*Primary Examiner*—Phuoc Tran
(74) *Attorney, Agent, or Firm*—Kanesaka and Takeuchi

(57) ABSTRACT

In forming a color image, a covering device is placed upon a color area having a plurality of colors regularly arranged. The color area is light reflective and s formed of stripes. The covering device is formed of strips whose phase substantially matches the stripes of the color area and printed on the color area. A color is presented by a color mixture of colors not covered by the covering device in the color area, wherein the color mixture is a subtractive color mixture.

12 Claims, 11 Drawing Sheets

3
4
4(c)
4(b)
4(d)
4(e)
2
5
1
6
C
M
Y

81

81

14(c)
14(b)
81
80
82
14(d)

1

14(e)
C
M
Y
C
M
Y
C
M
Y
C
M
Y
C
M
Y

COLOR IMAGE FORMING METHOD, COLOR IMAGE FORMING APPARATUS, COVERING SHEET AND COLOR IMAGE

BACKGROUND OF THE INVENTION

The present invention relates to a color image forming method and the like in which images of colors can be obtained by simple means.

In the field of printing, in order to obtain an image having a colorful color tone, there is used a method for performing a gathering printing using a plurality of inks of different colors. For example, in a color printing, it has been general to employ a method of dividing at least three primary colors by plates, and sequentially performing a gathering printing to obtain a color image as desired.

In the conventional procedure, it is necessary to perform plural times of processing and printing operation in order to obtain one color image, which is also cumbersome. This requires, in case of printing by manual operation, three times greater than that of the case where a monochromatic image is formed. In case of using a printing apparatus, the apparatus in scale of three times is required.

It is an object of the present invention is to provide a simple color image forming method and the like which can obtain a color image by a single operation similar to the monochromatic printing.

SUMMARY OF THE INVENTION

In a color image forming method of a first aspect, a covering means is placed upon a color area comprising a plurality of colors regularly arranged, and a color is presented by a color mixture of colors not covered by the covering means in the color area.

In a color image forming method of a second aspect, based on the first aspect, the color area is light reflective, and the color mixture is a subtractive color mixture.

In a color image forming method of a third aspect, based on the second aspect, the color area is composed of three primary colors, cyan, magenta and yellow.

In a color image forming method of a fourth aspect, based on the second aspect, the color area is composed of at least two primary colors selected out of three primary colors, cyan, magenta and yellow.

In a color image forming method of a fifth aspect, based on the second aspect, the color area includes colors other than three primary colors, cyan, magenta and yellow.

In a color image forming method of a sixth aspect, based on the second aspect, the covering means is printed on the color area.

In a color image forming method of a seventh aspect, based on the second aspect, the covering means is formed on a light transmitting sheet, the light transmitting sheet being placed upon the color area.

In a color image forming method of an eighth aspect, based on the second aspect, a discoloring layer is provided on the color area, the discoloring layer being discolored to form the covering means.

In a color image forming method of a ninth aspect, based on the sixth aspect, the color area is formed stripes, the covering means is formed of stripes whose phase substantially matches with respect to the stripes of the color area.

In a color image forming method of a tenth aspect, based on the ninth aspect, the covering means is black.

In a color image forming method of eleventh aspect, based on the ninth aspect, the covering means is white.

In a color image forming method of a twelfth aspect, based on the ninth aspect, each width of the stripe in the color area is smaller the width to be resolved by the naked eye.

In a color image forming method of a thirteenth aspect, based on the ninth aspect, a light transmitting film having stripes of a light reflective color whose phase substantially matches the stripes of a plurality of colors in the color area is placed upon an image of an original, which is used to form an image comprising black stripes whose phase substantially matches the stripes of a plurality of colors in the color area, and the covering means is formed using an image comprising the black stripes.

In a color image forming method of a fourteenth aspect, based on the first aspect, the color area is transparent, the covering means is untransparent, and the color mixture is an additive mixture of color.

In a color image forming method of a fifteenth aspect, based on the fourteenth aspect, the color area is formed on a transparent sheet, the covering means is formed on a untransparent sheet, and the transparent sheet being placed upon the untransparent sheet.

In a color image forming method of a sixteenth aspect, based on the fifteenth aspect, the color area is composed of at least two primary colors selected from three primary colors, blue, red and green.

In a color image forming method of a seventeenth aspect, based on the fifteenth aspect, the color area is composed of three primary colors, red, blue and green.

In a color image forming apparatus of an eighteenth aspect, a covering means is placed upon a color area composed of a plurality of colors regularly arranged, and a color is presented by a color mixture of colors not covered by the covering means in said color area.

In a color image forming apparatus of a nineteenth aspect, based on the eighteenth aspect, further comprising a conveying means for a body to be formed, a color area forming section for forming a color area composed of a plurality of colors regularly arranged on the body to be formed, and a covering area forming section for forming a covering area placed upon at least a part of the colors of the color area on the body to be formed.

In a color image forming apparatus of a twentieth aspect, based on the nineteenth aspect, the color area comprising stripes of a plurality of colors arranged in a predetermined order and pitch, and the covering area is formed of stripes whose phase substantially matches the stripes of a plurality of colors in the color area.

In a color image forming apparatus of a twenty-first aspect, based on the twentieth aspect, the color area forming section comprises a stripe printing section for forming the stripes of a plurality of colors by being arranged on the body to be formed in a predetermined order and pitch parallel with the conveying direction of the body to be formed, and the covering area forming section comprises a thermal head for perforating a stencil sheet by a plurality of heat generating bodies arranged in a predetermined pitch, and a stencil printing section driven with the stencil sheet perforated by the thermal head mounted.

In a color image forming apparatus of a twenty-second aspect, based on the twenty-first aspect, a pitch of the heat generating bodies of the thermal head substantially matches the stripes of various colors of the color area formed on the body to be formed, and the perforated portion of the perforated stencil sheet mounted on the stencil printing section and the stripes of various colors in the color area formed on the body to be formed correspond to each other.

In a color image forming apparatus of a twenty-third aspect, based on the twenty-second aspect, the plurality of colors in the color area are colors of cyan, magenta and yellow, and the covering area is black.

In a color image forming sheet of a twenty-fourth aspect, comprising a color area having a plurality of colors regularly arranged, a color is presented by a color mixture of colors not covered when a part of the color area is covered.

In a color image forming sheet of a twenty-fifth aspect, based on the twenty-fourth aspect, at least a part of the plurality of colors is a color other than the primary color.

In a color image forming sheet of a twenty-sixth aspect, based on the twenty-fourth aspect, the color area is formed on a untransparent sheet.

In a color image forming sheet of a twenty-seventh aspect, based on the twenty-sixth aspect, the color area is formed of stripes.

In a color image forming sheet of a twenty-eighth aspect, based on the twenty-fourth aspect, the color area is transparent and is formed on the transparent sheet.

In a covering sheet of a twenty-ninth aspect, comprising a covering means for covering a part of the color area of the color image forming sheet, a color is presented on the color image forming sheet by a color mixture of colors not covered when the part of the color area is covered.

In a covering sheet of a thirtieth aspect, based on the twenty-ninth aspect, the covering means is black.

In a covering sheet of a thirty-first aspect, comprising a covering means applied to the color image forming sheet, the covering means in the covering sheet is formed on a transparent sheet.

In a covering sheet of a thirty-second aspect, comprising a covering means applied to the color image forming sheet, the covering means in the covering sheet is a stripe whose phase substantially matches the color area.

In a covering sheet of a thirty-third aspect, comprising a covering means applied to the color image forming sheet, the covering means in the covering sheet is formed on a transparent sheet.

In a color image object of a thirty-fourth aspect, a covering means is placed upon a color area comprising a plurality of colors regularly arranged, a color being presented by a color mixture of colors not covered.

In a color image object of a thirty-fifth aspect, according to the thirty-fourth aspect, the covering means is black.

In a color image object of a thirty-sixth aspect, a covering sheet provided with a covering means for covering a part of a color area of a color image forming sheet is placed upon the color image forming sheet provided with a color area comprising a plurality of colors arranged regularly, a color being presented by a color mixture of colors not covered.

In a color image object of a thirty-seventh aspect according to the thirty-sixth aspect, the color image forming sheet and the covering sheet are placed upon one another so that they are relatively moved at least at a part of the color image object.

According to the above-described color image forming methods, at least the following functions are obtained. A covering means is placed upon a color area comprising a plurality of colors arranged regularly. A color is presented by a color mixture of colors not placed upon the covering means in the color area.

According to the above-described color image forming apparatuses, at least the following functions are obtained a conveying means conveys a body to be formed. A color area forming section forms a color area comprising a plurality of colors arranged regularly. A covering area forming section forms a covering area placed upon a color area of a body to be formed, at least a part of colors constituting a color area being concealed. A color is presented by a color mixture of colors not placed upon the covering area in the color area.

The above-described covering sheet of the present invention is placed upon the color area of the color image forming sheet according to the present invention. There is obtained the color image according to the present invention with the color prevented by the color mixture of colors not placed upon the covering means in the color area.

DETAILED DESCRIPTION OF THE PREFERRED EMBODIMENTS

Figure 1A:
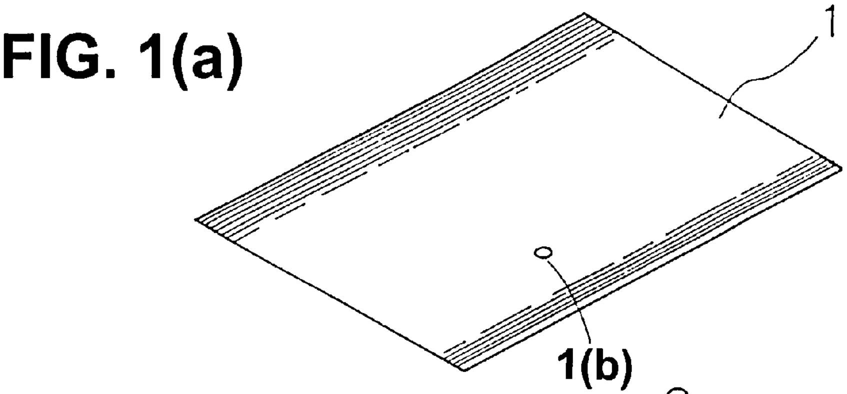
FIG. 1(*a*) is a perspective view showing an image forming sheet according to one embodiment and FIG. 1(*b*) is a partly enlarged view thereof.
Figure 1B:
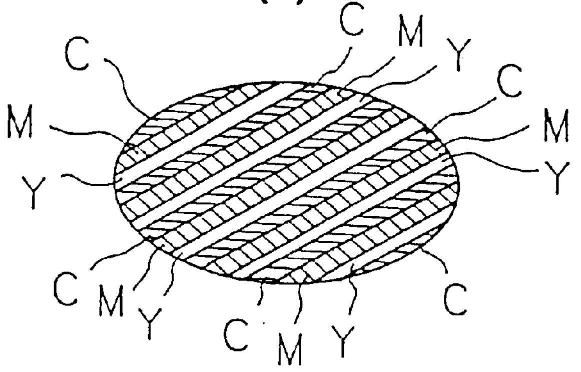

The present invention relates to a color image object provided with suitable colors obtained by a simple operation, a method for forming the color image object, an apparatus for forming the color image object, a color image forming sheet for constituting the color image object, a covering sheet. FIG. 1(*a*) shows a color image forming sheet 1 used in one embodiment of the present invention. The color image forming sheet 1 has a color area comprising a plurality of colors arranged regularly provided on a sheet-like base such as paper. The color area of the color image forming sheet 1 according to the present embodiment has inks of three primary colors, cyan c, magenta M and yellow y printed on a sheet-like base such as paper in a predetermined form.

In the present embodiment, as shown in an enlarged view of FIG. 1(*b*), inks of various colors are printed in a predetermined order alternately without clearance so as to have stripes (webs or stripes) having a predetermined width. Accordingly, the color image forming sheet 1 can be observed as different colors as a whole by a color mixture of various colors. The whole color depends on the reflecting density of inks of various colors, material of print sheet which is a body to be printed, and the like. For example, in case of wood free paper, the color is relatively dark brown at the reflecting density of 1.22, is relatively light brown at the reflecting density of 0.95, is light yellow or creamy yellow at the reflecting density of 0.54, and is light reddish white at the reflecting density of 0.38. If the balance of the reflecting density of inks of various colors to be printed, material of print sheet which is a body to be printed, and the like are changed, an image can be seen in black or grey.

In the present embodiment, the print width of webs of various colors can be freely set in the range of 0.05 mm to 0.22 mm in consideration of the visual effect. Accordingly, the stripes of various colors are repeated at a pitch of 0.15 to 0.66 mm. If the stripe width is set to approximately 0.1 mm or less, there exceeds a resolving power of the naked eye, and therefore, the fact that the color area on the color image forming sheet 1 is composed of three colors cannot be visualized. As a result, the recognition of colors of a color mixture is naturally effected. If the stripe width is set to 0.22 mm or more, the color mixture is hard to obtain. This supposes the case of a color image object to be seen from a very close distance such as a card. However, in the case of a color image object to be seen from a relatively distanced location such as a poster, even if the stripe width of various color constituting a color area of the color image forming sheet is large, the color mixture is to be felt.

The aforementioned reflecting density is the amount representative of a degree in which when in reflection, substance absorbs light. That is, let Io be the intensity of incident light and I be the intensity of reflecting light, the reflecting density D is $\log_{10}(Io/I)$. A densitometer for measuring the reflecting density is a reflecting densitometer RD-920(S) manufactured by Sakata Inks Co., Ltd., and the measuring range thereof is 0 to 2.50, and the colorimetric density is 0 to 2.50.

If printing is made with a covering means placed upon a part of the color image forming sheet 1, inks of a portion left without being covered are mixed and a constant color is presented. In the present embodiment, as the covering means a white ink W was used. For example, as shown in FIGS. 2(*a*) and 2(*b*), if only a portion of yellow Y of the color image forming sheet 1 is concealed in a web-like manner by white ink w, the color image forming sheet 1 is seen in blue (or purple) as a whole by the color mixture of the remaining cyan C and magenta M.

Figure 3A:
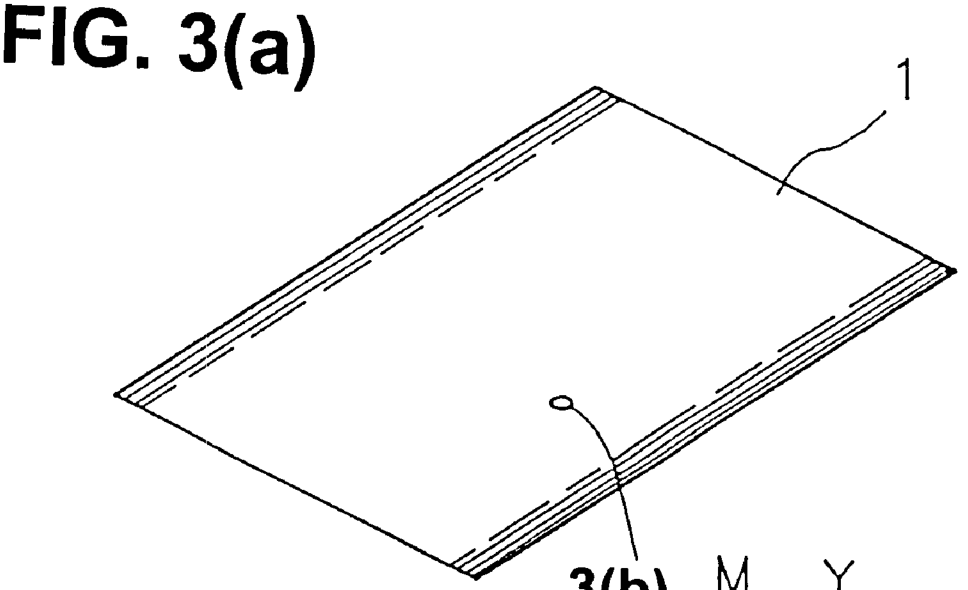
FIG. 3(*a*) is a perspective view showing an image forming sheet according to one embodiment having a covering means printed thereon and FIG. 3(*b*) is a partly enlarged view thereof.
Figure 3B:
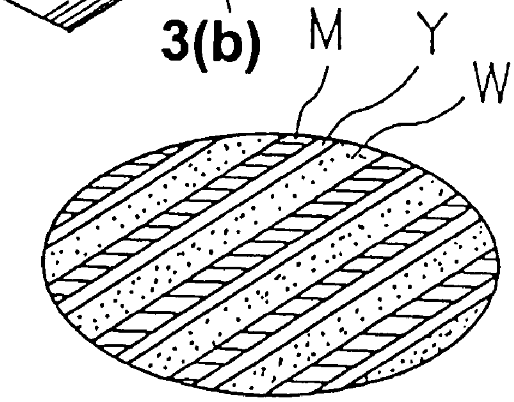

Further, as shown in FIGS. 3(*a*) and 3(*b*), if the white ink W is printed in a web-like manner on a part of yellow Y and the whole cyan C of the color image forming sheet 1, the color image forming sheet 1 is seen in red as a whole by the color mixture of the remaining part of yellow Y and magenta M.

Figure 2A:
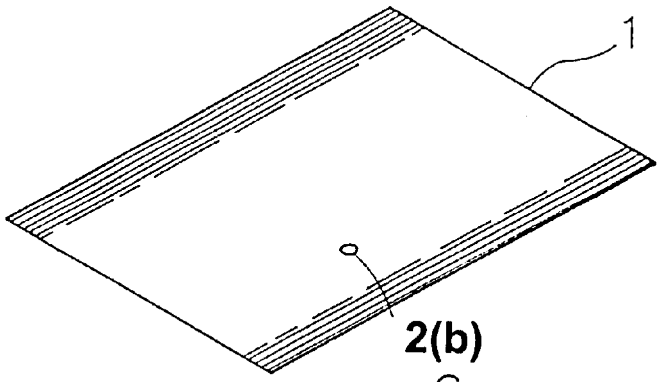
FIG. 2(*a*) perspective view showing an image forming sheet according to one embodiment having a covering means printed thereon and FIG. 2(*b*) is a partly enlarged view thereof.
Figure 2B:
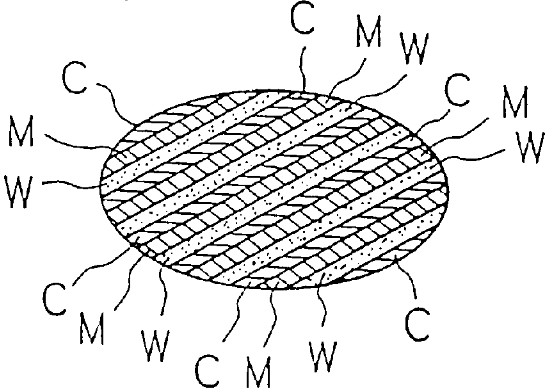

FIGS. 2(*a*) to 3(*b*) illustrate that white ink W is printed in a web-like manner on the color image forming sheet 1 corresponding to a stripe pattern for the color image forming sheet 1 to obtain a suitable color. Accordingly, it is possible to obtain colors other than those illustrated, and the color image forming sheet 1 presents a suitable color. Alternatively, a printing pattern of white ink W can be changed so that colors appear every area within the color image forming sheet 1. For example, a full color image can be presented within the color image forming sheet 1.

Figures 4A, 4B, 4C, 4D, 4E:
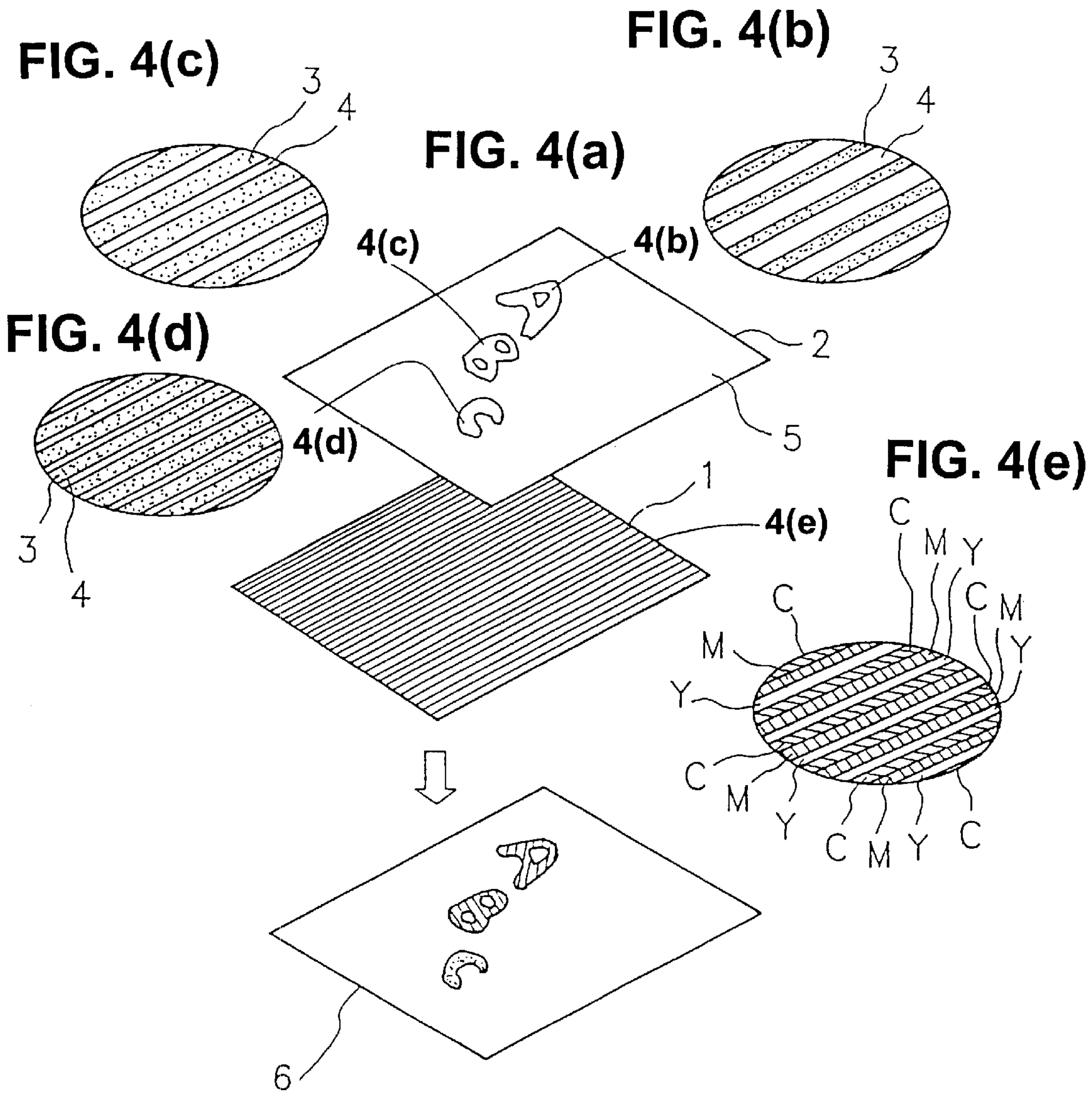
FIG. 4(*a*) is a perspective view showing a covering sheet having a covering means of white stripes, a color image forming sheet and a color image object obtained by placing both the sheets placed upon one another FIG. 4(*b*)–4(*e*) are partly enlarged views of the covering sheet and the color image forming sheet.

FIG. 4 shows an example in which a single color image forming sheet 1 is covered with white to present a color image comprising a plurality of colors. In this case, a white covering means such as white ink may be provided in a predetermined pattern on the color image forming sheet 1 by suitable means such as printing or transfer, etc. In this example, however, a predetermined image pattern comprising a white web-like portion and a transparent portion is formed on a covering sheet 2 which is a transparent sheet on which a white covering means is provided, which pattern is placed upon the color image forming sheet 1.

The covering sheet 2 shown in FIG. 4 has a transparent sheet covered with a white covering means. A portion formed with a image (in one example show, letters ABC) comprises a white web portion 3 and a transparent portion 4, and other portions are a white solid portion 5.

As shown in an enlarged view in FIG. 4, in the present embodiment, a white web portion 3 and a transparent portion 4 for constituting images of A, B and C are different in their width, spacing and the like from one another.

When the covering sheet 2 is placed upon the image forming sheet 1 shown in FIG. 1(*a*), a color image object 6 is obtained in which images A, B and C different in color from one another are disposed in a white ground. In the present embodiment, colors of the images A, B and C are specified, but it is noted of course that suitable colors can be presented depending on the width of the white web portion 3 and the spacing.

Incidentally, it is noted in the example shown in FIG. 4 that the whole surface of the transparent sheet is covered in advance with the white covering means and the covering means corresponding to the image portion may be removed in a stripe fashion by a pattern by which a color is obtained, or a white solid portion and an image may be directly formed on the transparent sheet by the white covering means. It is further noted that a white stripe-like covering means is provided on only a portion corresponding to an image of a transparent sheet and nothing is provided on other portions leaving transparent. In this case, an image of suitable color appears in a ground color (a color being presented by the color mixture of three colors of CMY) of the color image forming sheet 1.

Next, a color image forming apparatus will be described in which a part of the color image forming sheet 1 is covered with a covering means having a predetermined pattern and an image of colors is presented by a color mixture of primary colors not concealed. As the forming means of the covering means as described, there can be employed a method for printing white ink on a color image forming sheet, as in the example described by reference to FIGS. 2(*a*) to 3(*b*).

Figure 5A:
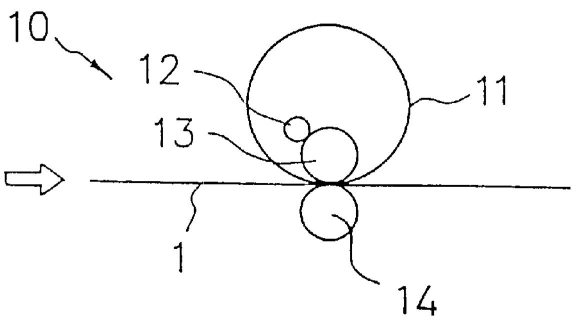
FIG. 5(*a*) is a view showing a schematic construction of a color image forming apparatus making use of a rotary stencil press and FIG. 5(*b*) is a conveying mode of a color image forming sheet in the apparatus.
Figure 5B:
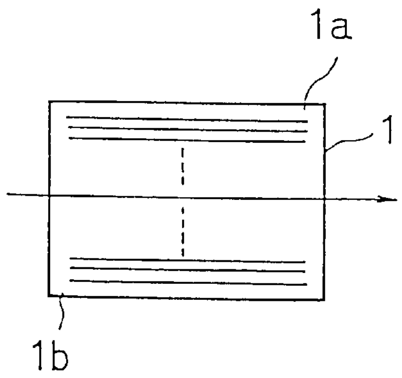

More specifically, rotary stencil printing machine 10 as shown in FIG. 5(*a*) can be used. A stencil drum 11 having an ink transmissive peripheral wall is rotated about its own axis by drive means not shown. Within the stencil drum 11 are provided a doctor roller 12 and a squeegee roller 13 which constitute a part of ink supply means so that white ink as a covering means can squeegee on the inner peripheral surface of the stencil drum 11 in synchronism with the drive of the stencil drum 11.

A perforated stencil sheet is wound around the outer peripheral surface of the stencil drum 11. A stripe-like pattern of white ink to be printed on the color image forming sheet 1 is perforated on the stencil sheet. It is of course that a web-like pattern formed on the stencil sheet corresponds to a stripe-like pattern of three colors formed on the color image forming sheet 1 so that a color appears on the color image forming sheet 1 after printing. The stencil sheet is wound around the stencil drum 11 so that the longitudinal direction of a stripe-like pattern formed on the stencil sheet coincides with the moving direction of the peripheral surface of the stencil drum 11.

Below the stencil drum 11 is provided a press roller 14 as a pressing member in contact with or close to the stencil drum 11. The color image forming sheet 1 as a body to be printed which will be a color image object after printing is fed between the stencil drum 11 and the press roller 14. As shown in FIG. 5(*b*), the color image forming sheet 1 is fed so that the longitudinal direction of a stripe-like pattern coincides with the feeding direction by the stencil drum and the press roller.

If the rotary stencil printing machine 10 having the above-described construction, white ink is printed in a predetermined stripe pattern from the stencil sheet of the stencil drum 11 on the color image forming sheet 1 supplied between the stencil drum 11 and the press roller 14, and as a result, an image of color is formed on the color image forming sheet 1.

In the printing-operation using the rotary press 10, the registration between the stencil sheet and the color is image forming sheet 1 with respect to the width direction perpendicular to the conveying direction of the color image forming sheet 1 is important. When the relative positional relation therebetween is deviated, colors appearing are different. In view of this, positions of webs of three primary colors are detected by a sensor at two corners la and 1*b* on a diagonal line of the color image forming sheet 1 to be conveyed, as shown in FIG. 5(*b*), the position in connection with the width direction of the color image forming sheet 1 can be precisely managed, and a desired color can be realized faithfully.

Figure 6:
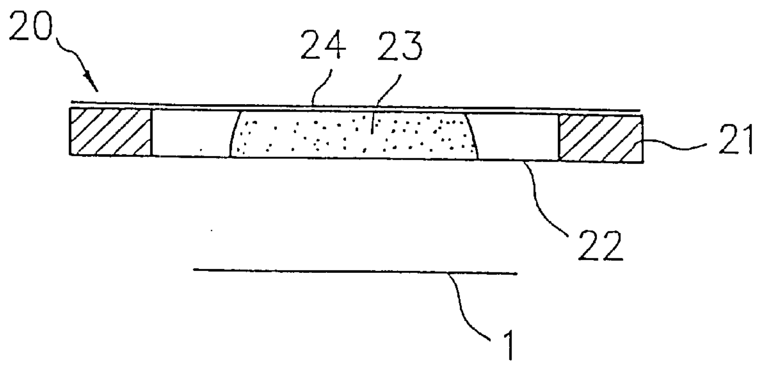
FIG. 6 is a schematic construction view of a color image forming apparatus making use of a pressing stencil press.

As another method for printing white ink on the color image forming sheet 1, a stencil printing machine 20 as shown in FIG. 6 can be also used. A perforated stencil sheet 22 is provided on the lower surface of a frame 21. A stripe-like pattern of white ink to be printed on the color image forming sheet 1 is perforated on the stencil sheet 22. Of course, the stripe-like pattern formed on the stencil sheet 22 corresponds to a stripe-like pattern of three primary colors formed on the color image forming sheet 1 and after printing, an image of color appears on the color image forming sheet 1.

White ink 23 is placed on the stencil sheet 22, and a cover 24 is provided on the upper surface of the frame 21 to cover-the white ink 23. The pressing press 20 is located at and placed on the color image forming sheet 1, and when pressing at a predetermined pressure, the white ink 23 is printed on the color image forming sheet 1 via the stencil sheet 22 in a predetermined stripe pattern, and as a result, an image of color is formed on the color image forming sheet 1. For locating the color image forming sheet 1 and the stencil sheet 22 in the pressing press 20 having the present construction, means similar to the locating of the rotary stencil printing machine 10 can be applied.

Next, as means for covering a part of a pattern of the color image forming sheet to present a color, there can be employed a procedure for providing a covering means on the color image forming sheet by a method other than the stencil printing.

Figure 7:
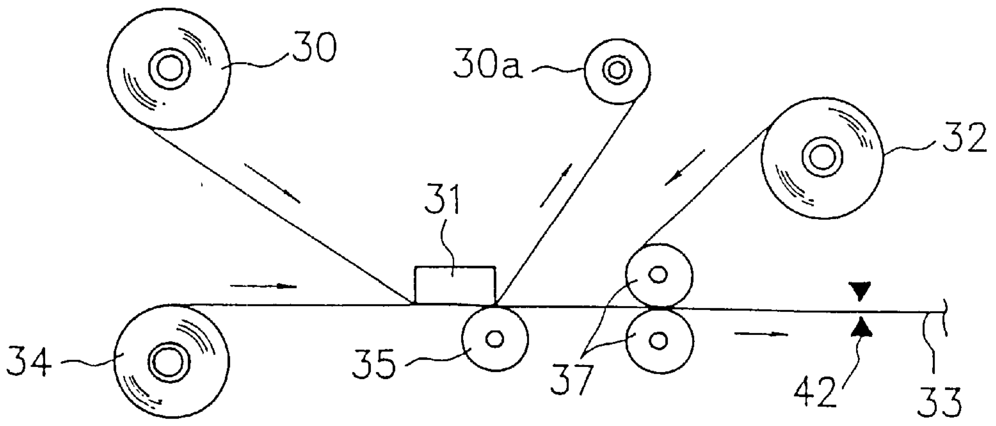
FIG. 7 is a schematic construction view of a color image forming apparatus using a ribbon-like color image forming sheet, a white transfer ribbon and a thermal head.

FIG. 7 shows an apparatus in which a white transfer ribbon 30 and a thermal head 31 are used to form a white stripe having a predetermined pattern on a roll-like color image forming sheet 32 to obtain a color image object 33 of color. The roll-like transfer ribbon 30 and a roll-like transparent film 34 are placed upon one another and are conveyed while being held by the thermal head 31 as transfer means and a platen roller 35.

The thermal head 31 applied with a drive signal transfers white ink 36 of a transfer ribbon to the transparent film 34. A pattern of the white ink 36 transferred to the transparent film 34 corresponds to a stripe-like pattern of three primary colors formed on the color image forming sheet 32 described later, and after printing, a color appears on the color image forming sheet 32.

As shown in FIG. 7, a transfer ribbon 30a after transfer is wound after being moved out of the thermal head 31. The transparent film 34 having the white ink 36 transferred thereto is fed into a pressing feed roller 37. The roll-like color image forming sheet 32 is also fed into the pressing feed roller 37, and the transparent film 34 and the color image forming sheet 32 are integrated.

Figure 8:
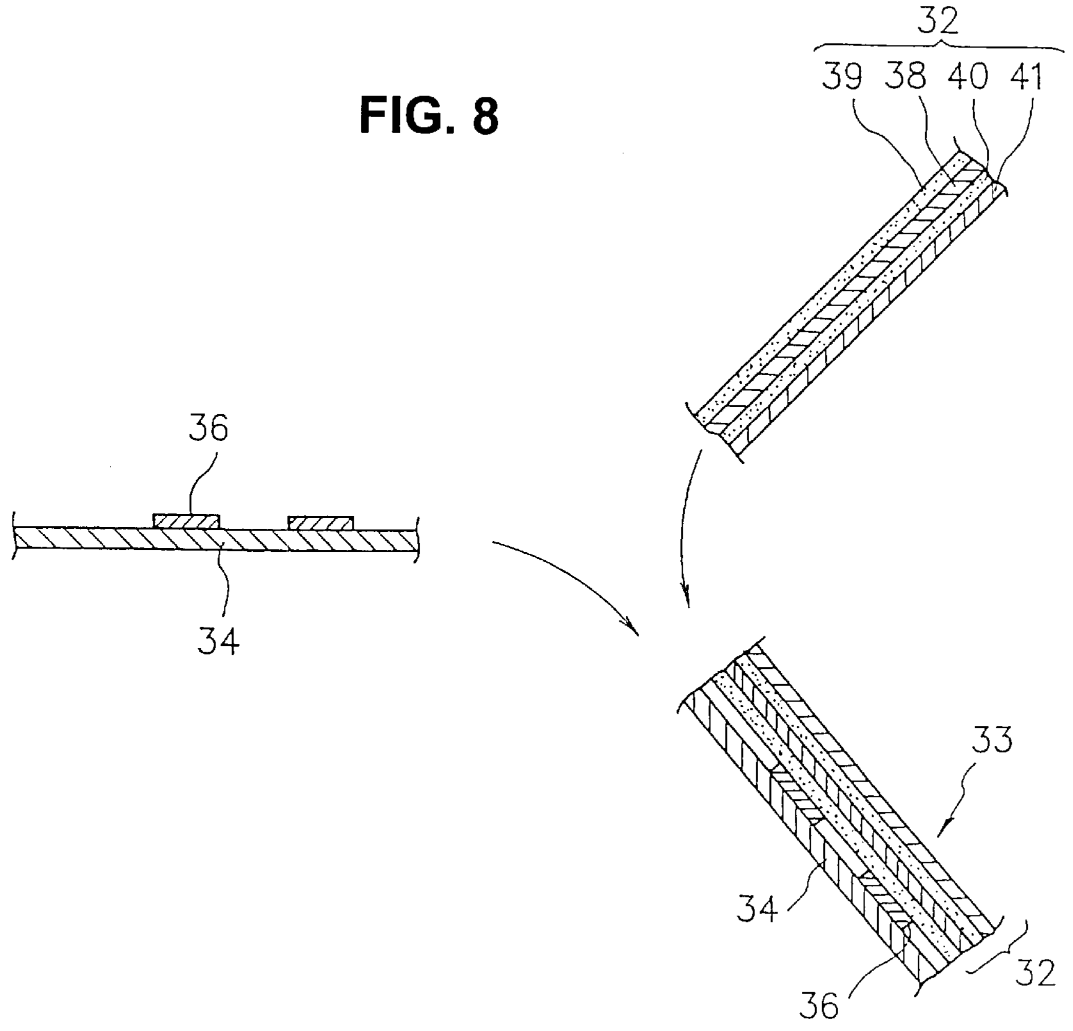
FIG. 8 is an enlarged sectional view of a color image object formed by the apparatus shown in FIG. 7.

As shown in FIG. 8, the color image forming sheet 32 has a sheet portion 38 formed on the front surface side with a stripe-like portion of three primary colors, a tacky layer 38 provided on the front surface side of the sheet portion 38, and a stripping sheet 41 provided on the rear surface side of the sheet portion 38 through a tacky layer 40. The construction of the stripe-like portion of three primary colors is similar to that described with reference to FIG. 1.

As shown in FIG. 8, the side of the transparent film 34 to which the white ink 36 is transferred is pasted to the tacky layer 39 on the front surface side of the color image forming sheet 32 so that both are integrated. As observed from the side of the transparent film 34, the white ink 36 having a predetermined pattern is placed upon a part of the pattern of three primary colors of the color image forming sheet 32. Accordingly, the color image forming sheet 32 will be a color image object 33 having a color and image by the color mixture of primary colors not covered with the white ink 36.

The color image object 33 discharged from the pressing feed roller 37 is cut into a length by a cutter 42 and can be pasted to a suitable object by stripping the stripping sheet 41.

Both the stripe-like pattern of he white ink 36 and the stripe-like pattern of primary colors in the present apparatus are parallel with the conveying direction. It is to be noted that in the registration therebetween, the axial position of the roll-like color image forming sheet 32 may be adjusted.

As other color image forming apparatuses, an apparatus can be used in which a laser beam printer is used to print a white toner on the color image forming sheet. Alternatively, a heat transfer ribbon of white ink is provided on a press for a word processor having a thermal head, and a pattern formed on an image plane of the word processor is printed on the color image forming sheet with white ink to form an image of color as mentioned above.

Since in the above-described embodiment, the stripe-like pattern of primary colors in the color image forming sheets 1 and 32 and the stripe-like pattern of the white covering means for covering the former are parallel with each other, a color appearing within a predetermined area was constant. However, when both the stripe-like patterns are inclined and placed upon one another, a rainbow-like color effect in which a plurality of colors appear while continuously changing. This results from the fact that the covering state of the stripe-like pattern of primary colors is not constant and continuously changed in the longitudinal direction of the web to produce a moire effect. Similar effect can be obtained in the case where the width of the stripe-like patterns of a covering object is uneven without inclining both the stripe-like patterns each other.

In the above-described embodiment, the case has been illustrated in which a part of a pattern of three primary colors, cyan, magenta and yellow is covered by the covering means to cause a color to present. This is one example of a subtractive color mixture for observing printed matter by a reflecting light.

The present invention can be also applied to the case of an additive color mixture by the color mixture of transmissive light. In the case of the additive color mixture, three primary colors comprises blue, red and green, and as the covering means, for example, a transparent covering object such as black ink can be used. In the case where a color image object of the additive color mixture is formed, transparent inks of the three primary colors are printed on a transparent sheet in a stripe-like pattern without clearance alternately to provide a color image forming sheet. If this color image forming sheet is observed by the transmissive light, color is generated as a whole which is seen in white.

A stripe-like pattern is printed in black ink on the color image forming sheet. Alternatively, a stripe-like pattern whose phase substantially matches the stripe of the color image forming sheet is printed in black ink on the light reflecting sheet of white color to provide a covering means, which is placed upon the color image forming sheet. In any case, since light does not pass though the portion superposed to the pattern of black ink, the color of the color image forming sheet is determined by the color mixture of the transmissive light in a portion not covered with the black ink. As described, also in the case of the additive color mixture, an image can be formed on the color image forming sheet in a color.

As the untransparent covering means in the case of the additive color mixture, not only black ink but ink through which light does not pass can be used. Further, a portion to be untransparent may be scratched so that light is hard to pass through, not limiting to ink.

In the above-described embodiments, three primary colors having been used for the color image forming sheet, it is to be noted that in the present invention, three primary colors need not be necessarily used as colors constituting a color area. For example, even if two colors out of three primary colors are used, coloration comprising three colors or more can be presented. Further, the color area formed on the color image forming sheet need not be necessarily constituted by the primary colors but other colorations can be employed. For example, there can be suitably employed, in consideration of visual effect, various intermediate color other than primary colors, metal luster colors including gold color and silver color, pearl luster color, fluorescent color, colorations by ink including metal powder, and the like. For example, if the fluorescent color is employed, the whole image can be seen sharply and brightly.

In the above-described embodiments, the covering means provided on the color image forming sheet by printing or the covering means provided on the covering sheet was white or black, but covering means according to the present invention need not be necessarily white or black. Various colorations as mentioned above used in the color area of the color image forming sheet can be employed as coloration of the covering means while taking the visual effect by a combination of colors used in the color image forming sheet into consideration. It is to be noted that in the case where the covering means is placed upon the color image forming sheet, the coloration having a predetermined pattern constituting the color image forming sheet is surrounded by a black pattern in a finely visual mode. Therefore, the contour of the image appearing on the color image forming sheet becomes clearer.

In the above-described embodiments, the covering means is provided on the color image forming sheet having the color area to obtain a color, but it is noted that the color area need not necessarily be provided on the sheet-like object. For example, a color area similar to the color image forming sheet is formed on the surface of an article having a three-dimensional configuration, and the covering means is provided thereon to present a color on the surface of the article.

In the above-described embodiments, a stripe pattern is employed as a pattern of colors constituting a color area on the color image forming sheet, and the covering means having a stripe pattern is placed thereupon to form an image of a color. In this case, for the locating of the pattern of colors to the covering means, a high precision is not required at least in the longitudinal direction of the stripe, and if the locating is made in the direction perpendicular to the stripe, a color can be realized precisely.

However, the color pattern for forming the color area in the present invention is not limit to the stripe. For example, there can be used a pattern in which fine points of a plurality of colors are disposed regularly, for example. The shape of points may be a square or the like other than a fine circle. As the mode of arrangement of points, one can be used which can obtain a natural color mixture when observed by the naked eye. In this case, the covering means placed upon the color pattern may be constituted by a pattern composed of similar fine points whose phase substantially matches the pattern of the color area.

Next, another embodiment of the color image forming apparatus will be described with reference to FIGS. 9 to 12. This color image forming apparatus 50 can print a color area of a stripe pattern of three primary colors, cyan, magenta and yellow on a sheet to be printed 51 which is a body to be printed to form a color image forming sheet, and continuously thereto can print black ink as covering means on the color image forming sheet so that the phase thereof substantially matches the stripe to present an image of color on the color image forming sheet.

The color image forming apparatus 50 has a sheet feed belt 52 as the conveying means for conveying the sheet to be printed 51. Above the sheet feed belt 51 is provided a color area forming portion 53 at the first half position in the conveying direction. The color area forming portion 53 has three web printing portions 4, each of the web printing portions 54 continuously printing a stripe pattern of three primary colors, cyan C, magenta M and yellow Y on the sheet to be printed 51 to form a color image forming sheet.

Figure 10:
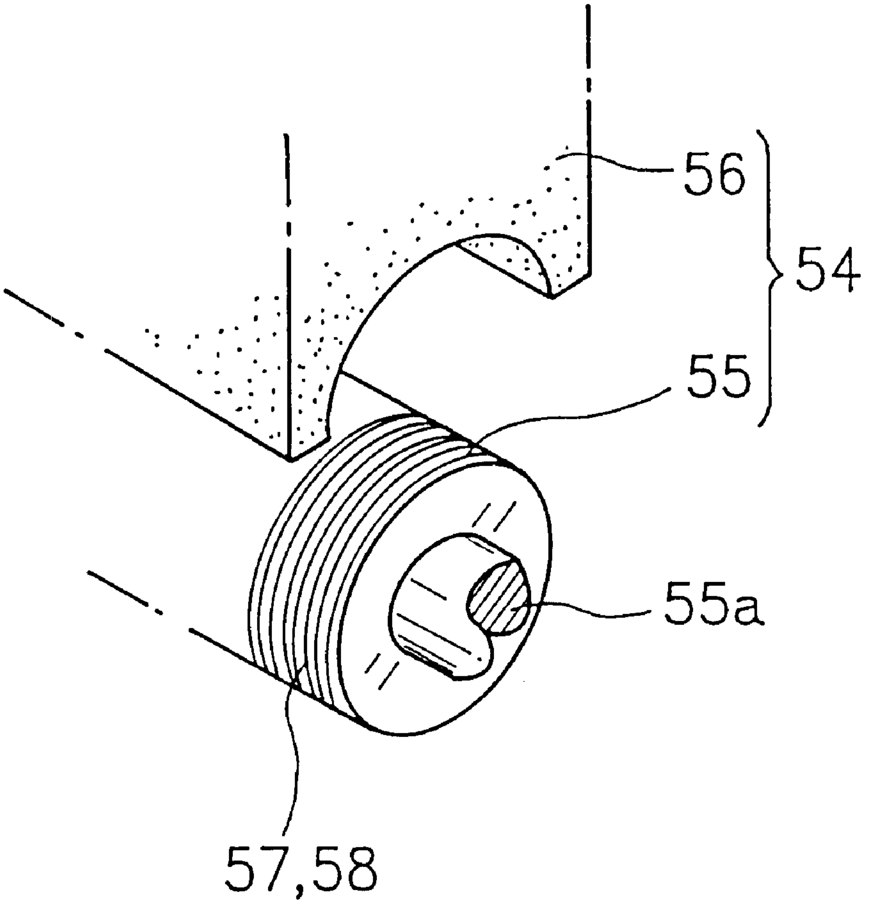
FIG. 10 is an enlarged perspective view of a web printing section of the color image forming apparatus shown in FIG. 9.
Figure 11:
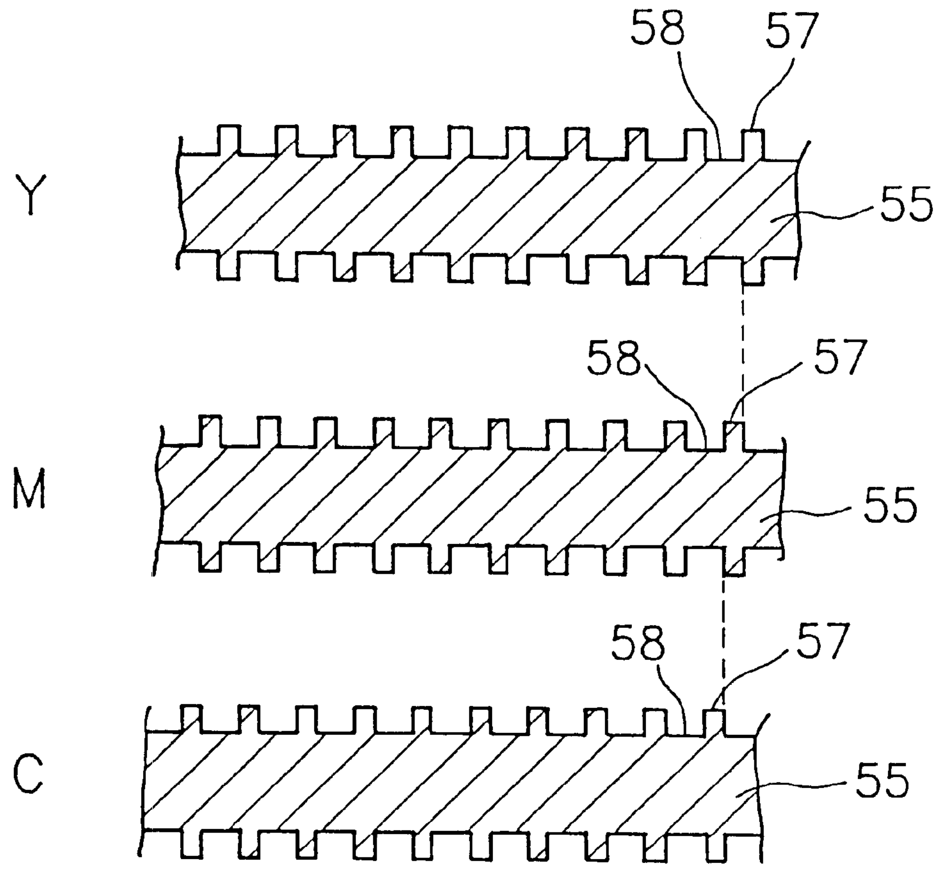
FIG. 11 is a sectional view showing the construction of a printing roller in the web printing section of the color image forming apparatus shown in FIG. 9.

As shown in FIG. 10, the web printing portions 54 each have a printing roller 55 and an ink pad 56 for supplying ink to the printing roller 55. Ink of various colors is supplied to each of the ink pads 56 by an ink supply means not shown. The printing roller 55 has a rotational shaft 55*a* perpendicular to the conveying direction of the sheet to be printed 51. The printing roller 55 is rotated in synchronism with the drive of the sheet feed belt 51 to apply printing to the sheet to be printed 51 while holding the sheet to be printed 51 between it and the sheet feed belt 51. The printing roller 55 is formed in its peripheral surface with a plumber of convex portions 57 having a predetermined width parallel with the conveying direction of the sheet to be printed 51 with a groove 58 having a predetermined width put therebetween. As shown in FIG. 11, in the present embodiment, the width of the convex portion 57 is 62.5 μm and the width of the groove 58 is 125 μm. The convex portions 57 of the printing rollers 55 of three web printing portions 54 are deviated by one (1) pitch (62.5 μm) in the direction of the rotational shaft 55*a* of each printing roller 55, and the stripes of cyan, magenta and yellow can be printed continuously without clearance on the single sheet to be printed 51. According to the kind of ink, the pitch of the convex portions 57 may be remained unchanged with the width of the convex portion 57 being 60 μm, and a clearance may be provided between the stripes formed on the sheet to be printed. The clearance on which stripe is not printed serves as a blur preventing portion for the adjacent stripes. In this case, further, there can be also obtained the operation for making the whole sheet to be printed 51 brighter.

Figure 9:
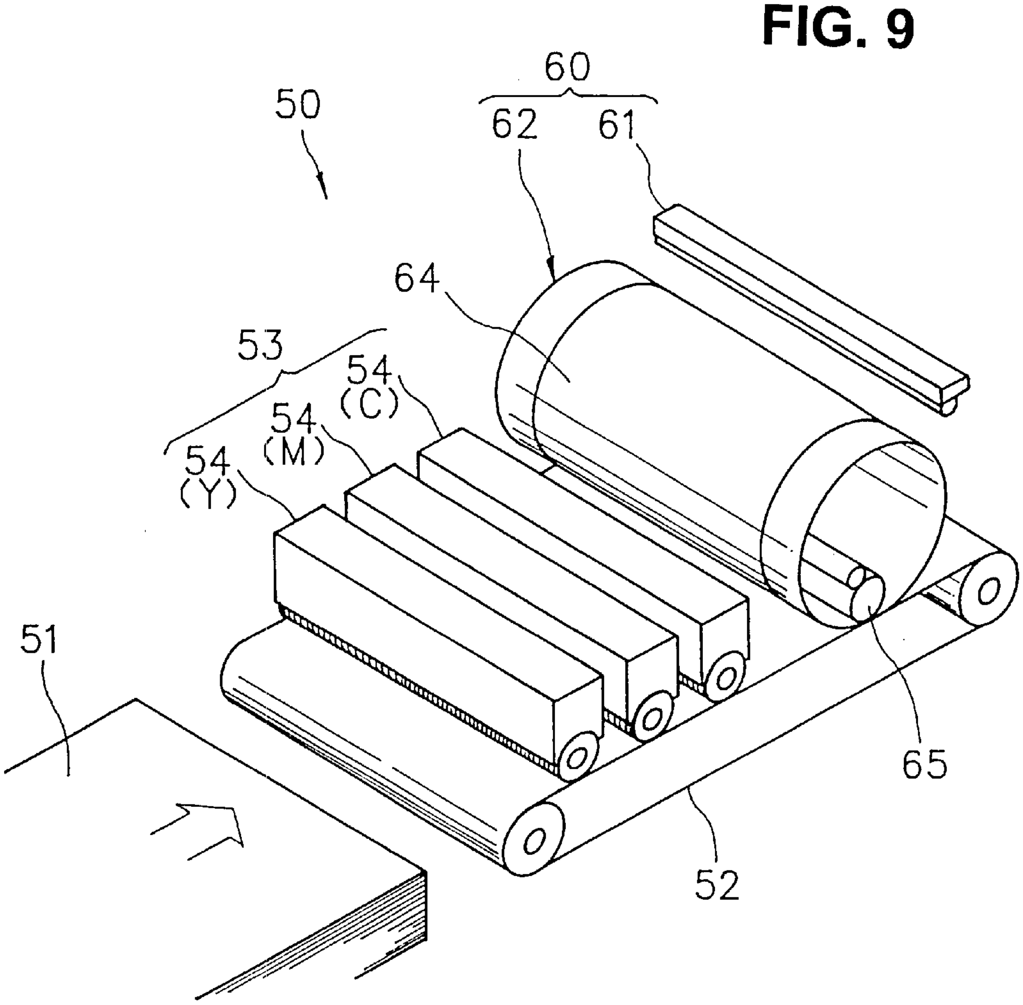
FIG. 9 is a perspective view showing another embodiment of the color image forming apparatus.

As shown in FIG. 9, the above sheet feed belt 51 is provided with a covering area forming section 60 at the latter half position in the conveying direction. The covering area forming section 60 has a thermal head 61 for heat-sensitively perforating a stencil printing sheet S for perforation and a stencil printing portion 62 to which the perforated stencil printing sheet S is attached and which is driven.

Figure 12:
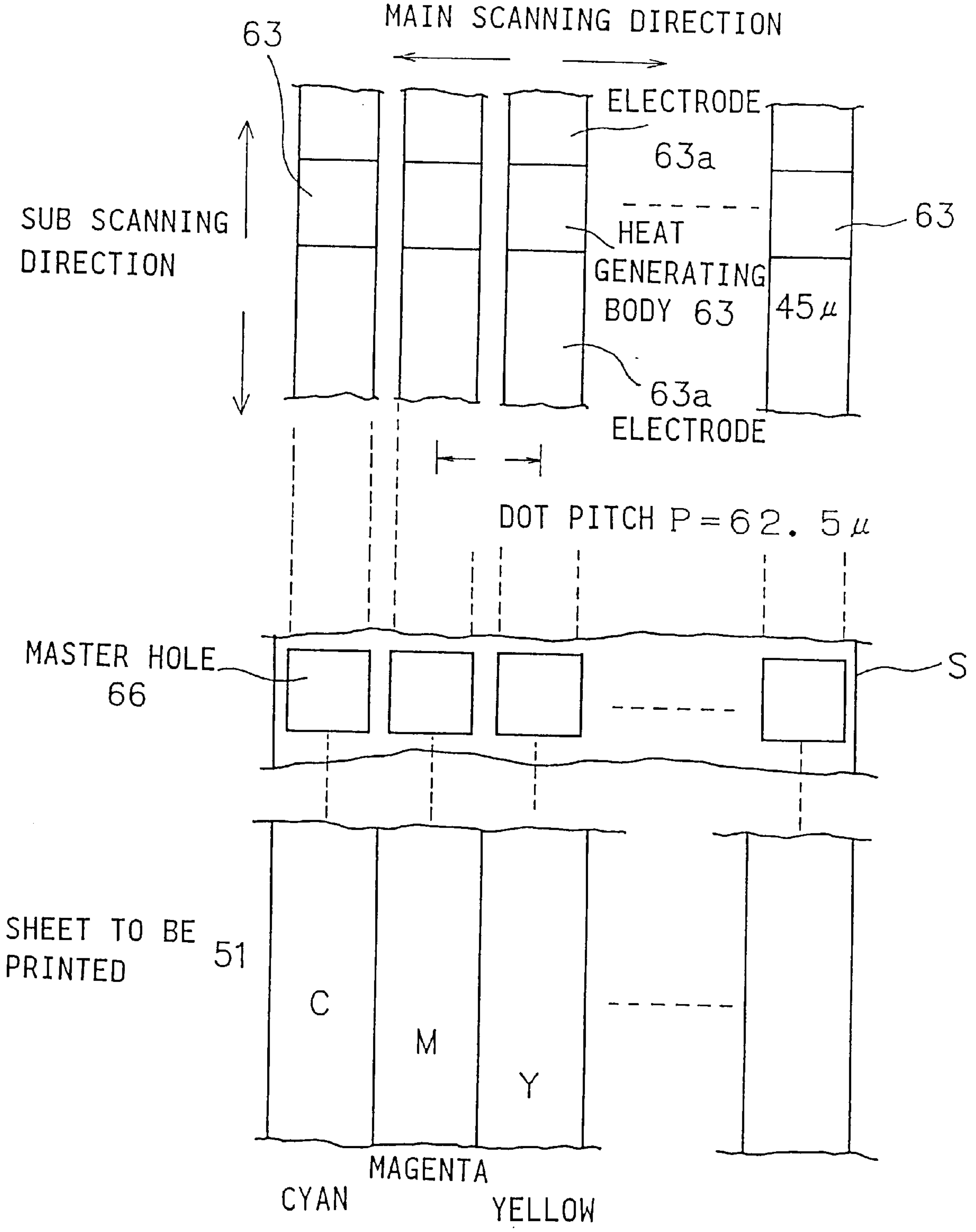
FIG. 12 is a view showing the relationship between a heat generating body and a master hole in the color image forming apparatus shown in FIG. 9.

As shown in FIG. 12, the thermal head 61 has a number of heat generating bodies 63 arranged in a predetermined pitch in the main scanning direction. The heat generating bodies each are provided on an electrode 63*a*. In the present embodiment, the heat generating body 63 is 48 to 60 μm in the sub scanning direction parallel with the longitudinal direction of stripe of three primary colors printed on the sheet to be printed 51, and is 45 μm in the main scanning direction perpendicular to the sub scanning direction. Further, the arranging pitch of the heat generating body 63 in the present embodiment substantially matches the pitch of the stripe of the color image forming sheet formed in the color area forming portion 53. That is, the heat generating bodies are disposed in the main scanning direction at a pitch of 62.5 μm.

The stencil printing portion 62 has a printing drum 64 which is rotated around its own axis. An ink transmissive printing area is present in at least a part of the peripheral surface of the printing drum 64, and the perforated stencil printing sheet S is mounted on the peripheral surface of the printing drum 64 including the printing area. The printing drum 64 is interiorly provided with an ink supply means 65 for supplying ink to the inner peripheral surface of the printing drum 64. The printing drum 64 is driven in synchronism with the sheet feed belt 52 to apply printing to the sheet to be printed 51 while holding the sheet to be printed 51 between it and the sheet feed belt 52 to convey the same. In the present embodiment, black ink is used.

Although not shown, the color image forming apparatus 50 in the present embodiment comprises a read means for reading a full color original image to be printed and a thermal head driving portion for processing image data read by the read means to produce a thermal head drive signal. According to the thermal head driving portion, the stencil printing sheet S can be perforated so that adequate black printing is applied to each stripe of three colors formed on the sheet to be printed 51, and an original full color image can be reproduced by a color mixture of portions not covered by black.

As shown in FIG. 12, in the present embodiment, it is configured so that perforated portions (master holes 66) of the perforated stencil printing sheet S mounted on the stencil printing portion 62 and stripes of various colors in the color area formed on the sheet to be printed 51 meet at the mutually corresponding position. The registration between the master holes 66 of the stencil printing sheet S on the printing drum 64 and the stripes of colors of the sheet to be printed 51 being fed from the color area forming portion 53 may be performed in the procedure similar to that of the previously described embodiment with reference to FIG. 5(*b*), for instance.

According to the color image forming apparatus 50 of the present embodiment, a full color image (a color image) can be formed despite the fact that a single stencil printing sheet is used, a single printing drum is used, and a stencil printing operation is performed once.

Next, an embodiment will be described in which a black covering means is printed on a color image forming sheet prepared in advance to form a color image as desired. In this embodiment, the stencil printing machine 20 shown in FIG. 6 is used. This using method is substantially similar to that of the previous embodiment described with reference to FIG. 6 except that black ink is used in place of white ink. The color image forming sheet used is the same as that shown in FIG. 1(*a*).

Figure 13:
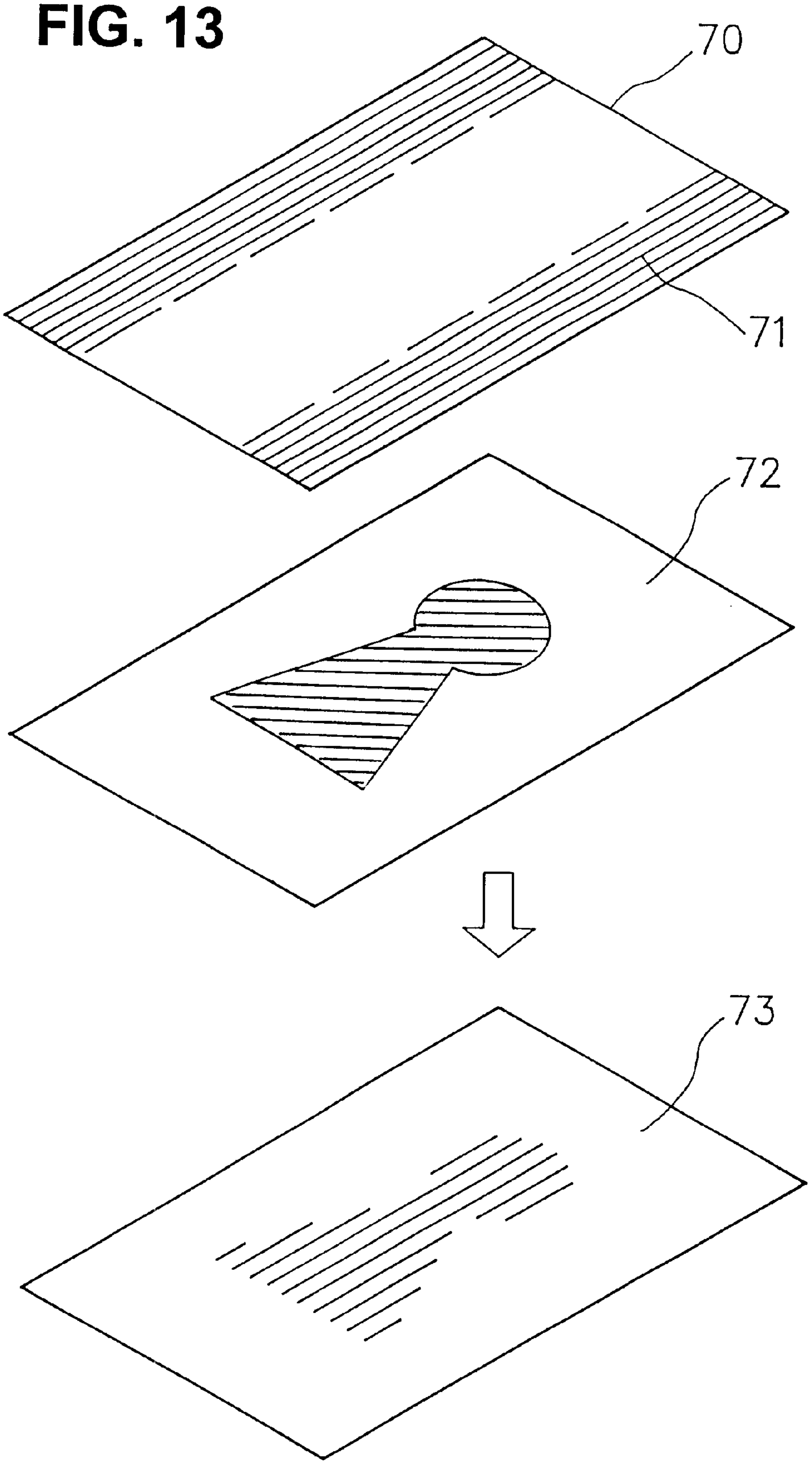
FIG. 13 is a view for explaining the procedure for forming a covering means comprising a black stripe using an original image, and FIG. 14(*a*) is a perspective view showing a covering sheet having a covering means of black stripe, a color image forming sheet and a color image object obtained by placing both the sheets upon one another, and FIGS. 14(*b*)–14(*e*) are partly enlarged views of the covering sheet and the color image forming sheet.

The perforation method for the stencil printing sheet S used here will be described with reference to FIG. 13. Stripes whose phase substantially match the stripes of original colors in the color area of the color image forming sheet are formed on a transparent film with light reflecting color. In the present embodiment, a white stripe 71 is formed on a transparent sheet 70 as a transparent film. The stripe is placed upon an original 72, for which electronic copying is taken to form a second original 73 constituted by black stripes. The black stripes constituting the second original 73 substantially match in phase the stripes of the primary colors in the color area of the color image forming sheet. The stencil printing sheet S is placed upon the second original 73 composed of the black stripes, and a flash of light is irradiated from the side of the stencil printing sheet S to heat the black portions of the second original 73, and the stencil printing original S is heat-sensibly perforated. It is to be noted that a stamp may be formed by using the stencil printing original S perforated by the method as in the present embodiment and pressed against the color image forming sheet to form a color image. In this case, the positional relation of the black stripes of the stamp is changed with respect to the stripes of the color area on the color image forming sheet every pressing. Thus, the coloration of the color image obtained changes delicately every time, and one can enjoy a colorful coloration and its change.

The method, in which a black covering means is provided on a color image forming sheet prepared in advance to reproduce a coloration as desired, can be performed substantially in the same manner as the method shown in FIGS. 7 and 8. Further, a laser beam printer may be used to deposit a black toner on the color image forming sheet. Alternatively, a thermal transfer ribbon of black ink may be provided on a press for a word processor having a thermal head and a pattern formed on an image plane of the word processor is printed with black ink on the color image forming sheet to form an image of coloration. Further, one surface of a transparent sheet with a black covering means printed thereon is used as a tacky surface, which is used as seal and pasted to the color image forming sheet to present various colorations. In this case, since a coloration delicately changes even if a position of the color image forming sheet to which the seal is pasted is slightly deviated, one can enjoy a color full coloration and its change.

Next, an embodiment will be described in which on the side of a color area of a color image forming sheet is provided a discoloring layer or a chromophoric layer as a covering means so as to provide a pattern which substantially matches that of the whole surface thereof or the color area, and the layer is discolored or generated in color to conceal a part of the color area to present a color.

The discoloring layers or chromophoric layers used include a heat sensitive chromophoric layer, a photochromism agent, a thermochromism agent, a piezochromism agent, a liquid crystal, etc.

The photochromism agent changes in color by ultraviolet ray, and returns an original state at dark place. Accordingly, if the photochromism agent which discolors to black is printed on the YMC stripe so as to cover colors other than color as desired, only the portion of the photochromism agent becomes black when the ultraviolet ray is irradiated and only the color on the portion not covered with the photochromism agent is exposed. Observation is made as if a color image is levitated from a place where nothing is present. If the ultraviolet ray is not present, it returns to the original state, and the image disappears. The operation similar to that described above occurs by heat in case of the thermochromism agent and by pressure in case of the piezochromism agent. The similar operation is obtained by the liquid crystal due to heat or electric field.

A heat sensitive chromophoric agent as a discoloring layer or a chromophoric layer will be described. The heat sensitive chromophoric agent contains one component of a leuco dye and a developer or both components. The leuco dye which is a chromophoric agent component and an acidic material which is a developer component are fused or mixed together by applying heat, and as a result, the leuco dye changes from colorless to colored.

As the leuco dye, those which have been used for heat sensitive sheets can be used. For example, fluorane, triphenylmethane, spiropylane, etc. are preferred. Specific examples of these include:

3-cyclohexylamino-6-chlorofurorane
3-dimethylamino-5,7-dimethylfurorane
3-dimethylamino-7-chlorofurorane
3-dimethylamino-7-methylfurorane
3-dimethylamino-7,8-benzfurorane
3-dimethylamino-6-methyl-7-chlorofurorane
3-diethylamino-7-(o-chroroanilino)furorane
3-dibutylamino-7-(o-chroroanilino)furorane
3-(N-methyl-N-amyl)amino-6-methyl-7-anilinofurorane
3-(N-methyl-N-cyclohexyl)amino-6-methyl-7-anilinofurorane
3-diethylamino-6-methyl-7-anilinofurorane
3-morphorino-7-(N-propyl-trifuroromethylanilino)furorane
3-pyridino-7-trifuroromethylanilinofurorane
3-pyridino-7-(di-p-chlorophenyl)methylaminofurorane
3-diethylamino-5-chloro-7-(α-phenylethylamino)furorane
3-diethylamino-5-methyl-7-(α-phenylethylamino)furorane
3-diethylamino-7-piperydinofurorane
3,3-bis(p-dimethylaminophenyl)-phthalid
3,3-bis(p-dibutylaminophenyl)-phtalid
3,3-bis(p-dimethylaminophenyl)-6-dimethyaminophtalid
3,3-bis(p-diemthylaminophenyl)-6-diethylaminophthalid
3,3-bis(p-dimethylaminophenyl)-6-chloroaminophthalid
6'-chloro-8'-methoxy-benzoindorino-pyrirospyrane
6'-bromo-3'-methoxy-benzoindorino-pyrirospyrane As the developer, various acidic materials which react with the leuco dye when in heating to color-generate the leuco dye can be used. For example, phenol materials, organic or inorganic acidic materials are preferred. Specific examples of these include:

Salicylic acid, 3-isopropylsalicylic acid,
3-cyclohexylsalicylic acid,
4,4'-isopropyridendiphenol(bisphenol),
4,4'-isopropyridenbis(2-chlorophenyl),
4,4'-isopropyridenbis (2,6-dibromophenol),
4,4'-isopropyridenbis(2-mehtylphenol),4,4'-cyclohexyridenbi sphenol, 4,4'-cyclohexyridenbis(2-methylphenol),
4-phenylphenol, 4-hydroxydiphenoxydo, α-naphthol, α-naphtol,
3,5-xylenol, thymol, 4-hydroxyacetopheone, catechol, resorcinol, hydroxynol, pyrogallol, furoroglycinol,
2,2'-methylnebis(4-chlorophenol), 2,2'-dihydroxydiphenyl,
p-hydroxyethyl benzoate, p-hydroxypropyl benzoate,
p-hydroxybutyl bensoate, p-hydroxybenzyl benzoate,
p-hydroxy benzoate-p-chrorobenzyl, p-hydroxy benzoate-p-methylbenzyl, benzoate, 1-hydroxy-2-naphthoic acid, 4-hydroxydiphenylsulfone,
bis(4-hydroxyphenyl)sulfide, 2-hydroxy-p-toluyl acid, tartaric acid, oxalic acid, maleic acid, citric acid, succinic acid, boric acid, clay, active clay, etc.

The using ratio between the leuco dye and the developer is 1 weight part of leuco dye to 1 to 10 weight parts of developer, preferably in the range of 2 to 5 weight parts.

Heat melting components can be contained in order to increase the chromophoric sensitivity. Compounds having a melting point of approximately 50 to 150° C., for example, such as fatty acid ester, fatty acid amido, wax and the like are preferred. Specific examples of these compounds include bensoate-4-benzylester, bensoate-4-methoxyphenyl ester, laurylacid amido, amido stearate, amido caproic acid, carnaba wax, montan wax, polyethylene wax, etc. The using amount of these heat melting components is 1 to 10 weight parts to 1 weight part of leuco dye, preferably in the range of 1 to 3 weight parts.

The above-described heat sensitive agent is covered on the whole surface of the color image forming sheet in which a plurality of colors constitute a color area in a predetermined pattern (in the embodiment, stripes of YMC). When the color image forming sheet is printed by a heat sensitive printer such as a word processor, the thermal head of the heat sensitive printer blackens the heat sensitive agent to cover a part of the color area of the color image forming sheet. Therefore, a color image appears on the color image forming sheet.

In this case, mounted on the word processor are a software for selecting what color of stripe of the color image forming sheet is selected according to the designated color, and a registration index or a registration sensor for registering the color image forming sheet with the position of the thermal head.

Further, if the heat sensitive agent is printed not on the whole surface of the color image forming sheet but in a pattern of an image, similarly to the chromic agent, a color image can be formed on the color image forming sheet merely by applying heat.

Further, if an image is printed on the color image forming sheet by a transparent tacky agent, a color powder (such as a black toner) is deposited on the transparent tacky agent in an image pattern by sprinkling the color powder, and the image can be floated on the color image forming sheet.

Figures 14A, 14B, 14C, 14D, 14E:
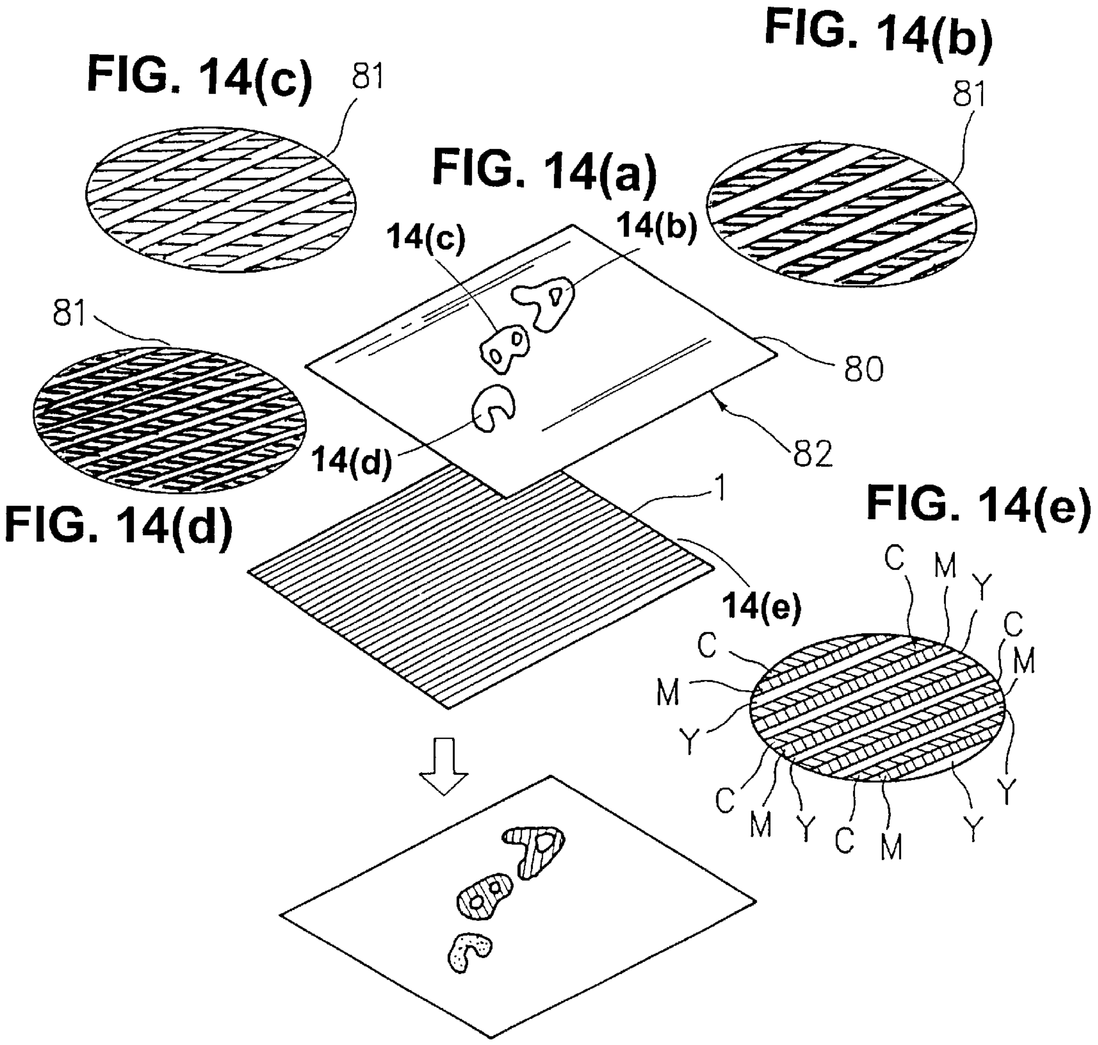

Next, an embodiment will be described in which the color image forming sheet and the covering sheet in which black covering means is printed on the transparent sheet, shown in FIG. 1(*a*), are used, both of which are placed one upon another to form a color image. As shown in FIGS. 14(*a*) –14(*e*), a transparent sheet 80 is formed with an image (in the figure, letter of "ABC") in a black stripe 81. The image portions are constituted by the black stripes 81 which are different in width. The transparent sheets 80 are placed one upon another on the color area of the color image forming sheet 1 described with reference to FIG. 1(*a*). A ground color of the color image forming sheet 1 is observed from a transparent portion of the transparent sheet 80, and the image "ABC" is observed in three colors by the color mixture of primary colors not concealed by the black stripes 81, in the image portion of the transparent sheet 80. The black stripe 81 may be constituted with the phase (width and pitch) which substantially matches the stripe of the color image forming sheet 1, and the image may be formed on the transparent sheet 80 in black color.

The stripe of CMY is formed on the transparent sheet 80 in transparent ink, and a black stripe is formed on an untransparent sheet, both of which are placed one upon another to observe it from the transparent sheet. Even this, the effect similar to that of FIG. 14(*a*) can be obtained.

Next, in the embodiment in which the color image forming sheet 1 shown in FIG. 1(*a*) and a covering sheet 82 in which a black stripe is printed on the transparent sheet 80 are used, both of which are placed one upon another to form an image, both the superposed sheets are not completely fixed but they can be moved relatively in at least a portion of a color image object. For example, only one side corresponding to each of the rectangular sheets is fixed together and covering sheet 82 cannot be moved relative to the color image forming sheet 1. In this way, the coloration of the color image is changed by an extremely small relative movement of both the sheets 1 and 82. Therefore, one can enjoy a colorful color tone and its change, the visual aesthetical effect is extremely great, and this is also effective as an advertisement means.

According to the present invention, a covering means is placed upon at least a part of a color area composed of a plurality of colors arranged regularly, and a color is presented by a color mixture of colors not superposed to the covering means. As will be apparent from the above-described embodiments, various colors can be employed for colors constituting a color area, and a pattern constituted by the colors is not limited to a stripe but various patterns can be employed. Furthermore, various colors can be employed for colors of the covering means for covering the color area, and for the means for providing the covering means on the color area, various devices, appliances, materials, procedures and the like as illustrated in the embodiments can be applied.

Since according to the present invention, a covering means is placed upon at least a part of a color area composed of a plurality of colors arranged regularly, and a color is presented by a color mixture of colors not superposed to the covering means, there is an effect in that a convenience in color image printing such as that an image of color can be formed is materially improved.

What is claimed is:

1. A color image forming method, comprising:

placing covering means upon a color area having a plurality of colors regularly arranged, said color area being light reflective and formed of stripes, said covering means being formed of stripes whose phase substantially matches with respect to the stripes of said color area and printed on said color area, and presenting a color by a color mixture of colors not covered by said covering means in said color area, said color mixture being a subtractive color mixture.

2. A color image forming method according to claim 1, wherein said covering means is black.

3. A color image forming method according to claim 1, wherein said covering means is white.

4. A color image forming method according to claim 1, wherein a light transmitting film having stripes of a light reflective color whose phase substantially matches the stripes of a plurality of colors in said color area is placed upon an image of an original, which is used to form an image comprising black stripes whose phase substantially matches the stripes of a plurality of colors in said color area, and the covering means is formed using an image comprising said black stripes.

5. A color image forming apparatus, comprising:

conveying means for a body to be formed, a color area forming section for forming a color area composed of a plurality of colors regularly arranged on said body to be formed, said color area comprising stripes of said plurality of colors arranged in a predetermined order and pitch, and a covering area forming section for forming a covering area placed upon at least a part of the colors of said color area on said body to be formed and having covering means placed on the color area, said covering area being formed of stripes whose phase substantially matches said stripes of said plurality of colors in said color area, a color being presented by a color mixture of colors not covered by said covering means in said color area.

6. A color image forming apparatus according to claim 5, wherein said color area forming section comprises a stripe printing section for forming said stripes of said plurality of colors by being arranged on said body to be formed in a predetermined order and pitch parallel with a conveying direction of said body to be formed, and said covering area forming section comprises a thermal head for perforating a stencil sheet by a plurality of heat generating bodies arranged in a predetermined pitch, and a stencil printing section driven with the stencil sheet perforated by said thermal head mounted.

7. A color image forming apparatus according to claim 6, wherein a pitch of the heat generating bodies of said thermal head substantially matches the stripes of said plurality of colors of said color area formed on said body to be formed, and the perforated portion of the processed stencil sheet mounted on said stencil printing section and the stripes of said plurality of colors in said color area formed on said body to be formed correspond to each other.

8. A color image forming apparatus according to claim 7, wherein said plurality of colors in said color area are colors of cyan, magenta and yellow, and said covering area is black.

9. A covering sheet comprising covering means applied to a color image forming sheet including a color area having a plurality of colors regularly arranged and formed of stripes on an untransparent sheet, said covering means covering a part of the color area of the color image forming sheet, and being a stripe whose phase substantially matches said color area and formed on a transparent sheet, a color being presented on said color image forming sheet by a color mixture of colors not covered when a part of said color area is covered.

10. A color image object comprising:

a color area having a plurality of colors formed of stripes, and covering means provided on the color area and being formed of stripes whose phase substantially matches the stripes of said color area so that a color is presented by a color mixture of colors not covered by said covering means in said color area.

11. A color image object according to claim 10, wherein said covering means is black.

12. A color image object according to claim 10, wherein said color area is formed on a color image forming sheet, said covering means is formed on a covering sheet, said color image forming sheet and said covering sheet are placed upon one another so that they are relatively moved at least at a part of said color image object.

* * * * *